(12) United States Patent
Chen et al.

(10) Patent No.: US 7,815,025 B2
(45) Date of Patent: Oct. 19, 2010

(54) CABLE ORGANIZING DEVICE

(75) Inventors: Chij-Hsiung Chen, Taipei Hsien (TW); Gwo-Jiun Jaw, Taipei Hsien (TW); Pei-Yu Wu, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 614 days.

(21) Appl. No.: 11/756,605

(22) Filed: May 31, 2007

(65) Prior Publication Data

US 2008/0053685 A1    Mar. 6, 2008

(30) Foreign Application Priority Data

Sep. 1, 2006    (TW) .............................. 95215576 U

(51) Int. Cl.
*B66C 13/12*    (2006.01)
*A44B 1/04*    (2006.01)
(52) U.S. Cl. .................................. 191/12 R; 24/115 R
(58) Field of Classification Search .............. 191/12 R, 191/12.2 R, 12.4; 242/388.1, 388.2; 174/154; 439/501; 24/115 R, 122.3, 129 R, 131 R, 24/129 D, 129 C, 115 J
See application file for complete search history.

(56) References Cited

U.S. PATENT DOCUMENTS

| | | | | |
|---|---|---|---|---|
| 3,806,671 A * | 4/1974 | Anderson | ............... | 191/12.2 R |
| 5,056,698 A * | 10/1991 | Kozakevich | ............... | 224/488 |
| 6,230,860 B1 * | 5/2001 | Wu | ....................... | 191/12.2 R |
| 6,698,560 B2 * | 3/2004 | Reardon et al. | ........... | 191/12 R |
| 6,960,727 B2 * | 11/2005 | Hering | ....................... | 174/135 |
| 2004/0129522 A1 * | 7/2004 | Skowronski | ............ | 191/12.2 R |

* cited by examiner

*Primary Examiner*—S. Joseph Morano
*Assistant Examiner*—Robert J McCarry, Jr.
(74) *Attorney, Agent, or Firm*—Christie, Parker & Hale, LLP

(57) ABSTRACT

A cable organizing device is adapted for use on an electronic device including a body, a plug, and a cable connected to the body and the plug to establish an electrical connection therebetween. The cable organizing device includes a coupling unit and a receptacle unit. The coupling unit is adapted to be secured to the body of the electronic device. The receptacle unit includes a first component connected to one side of the coupling unit that is distal from the body of the electronic device, and a second component connected to the first component at an angle and spaced apart from the coupling unit. The first and second components cooperatively define a stowage region adapted to stow the cable. The second component is provided to prevent undesired removal of the stowed cable from the stowage region.

4 Claims, 17 Drawing Sheets ial connection is established between the plugs 21 and the circuit module within the body 22.

CABLE ORGANIZING DEVICE

CROSS-REFERENCE TO RELATED APPLICATION

This application claims priority of Taiwanese Application No. 095215576, filed on Sep. 1, 2006.

BACKGROUND OF THE INVENTION

1. Field of the Invention

The invention relates to a cable organizing device, more particularly to a cable organizing device mounted on an electronic device for organizing a cable or cables of the electronic device.

2. Description of the Related Art

Widely used computer equipment, such as notebook computers, desktop computers, standard computer systems, mini personal computers (mini PCs), etc., need to be connected to various external peripheral equipment, such as power supplies, mouse devices, keyboards, screens, printers, etc., for purposes of operation. Data transmission or supply of electricity between the aforesaid peripheral equipment and the associated computer equipment is generally effected using electric cables and plugs or jacks. Particularly for power supplies, two power cables are generally needed for input of alternating current power and for output of direct current power, respectively. Accordingly, the greater the number of items of peripheral equipment the user employs, the higher will be the number of cables. If not properly organized, the cables will be in a messy and entangled state, and will take up a lot of space and impair the appearance and applicability of the equipment.

SUMMARY OF THE INVENTION

Therefore, the object of the present invention is to provide a cable organizing device for organizing cables neatly.

Accordingly, the cable organizing device of the present invention is adapted for use on an electronic device. The electronic device includes a body, a plug, and a cable connected to the body and the plug to establish electrical connection therebetween.

The cable organizing device includes a coupling unit and a receptacle unit. The coupling unit is adapted to be secured to the body of the electronic device. The receptacle unit includes a first component connected to one side of the coupling unit that is distal from the body of the electronic device, and a second component connected to the first component at an angle and spaced apart from the coupling unit. The first and second components cooperatively define a stowage region adapted to stow the cable. The second component is provided to prevent undesired removal of the stowed cable from the stowage region.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
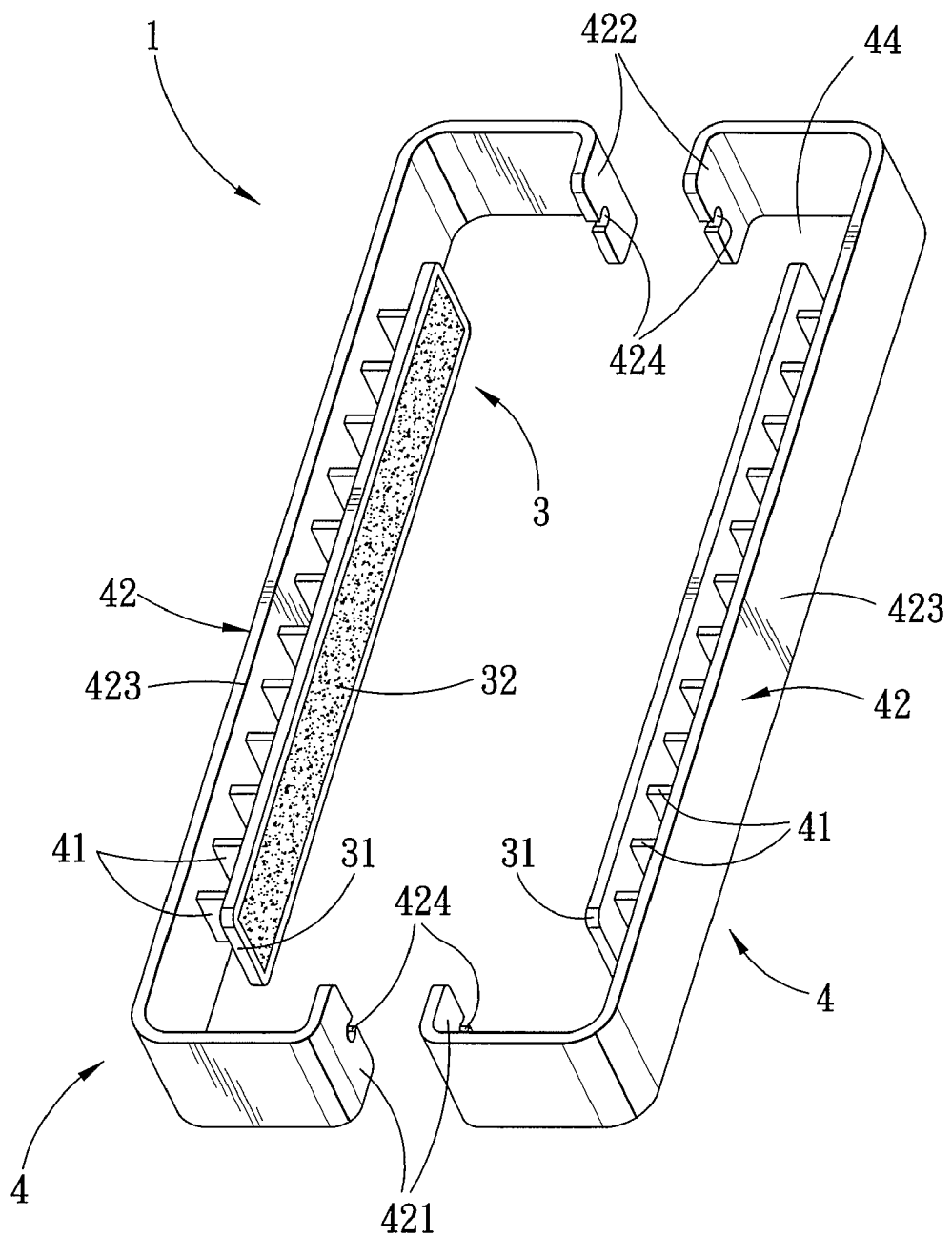
FIG. 1 is a perspective view of the first preferred embodiment of a cable organizing device according to the invention.
Figure 2:
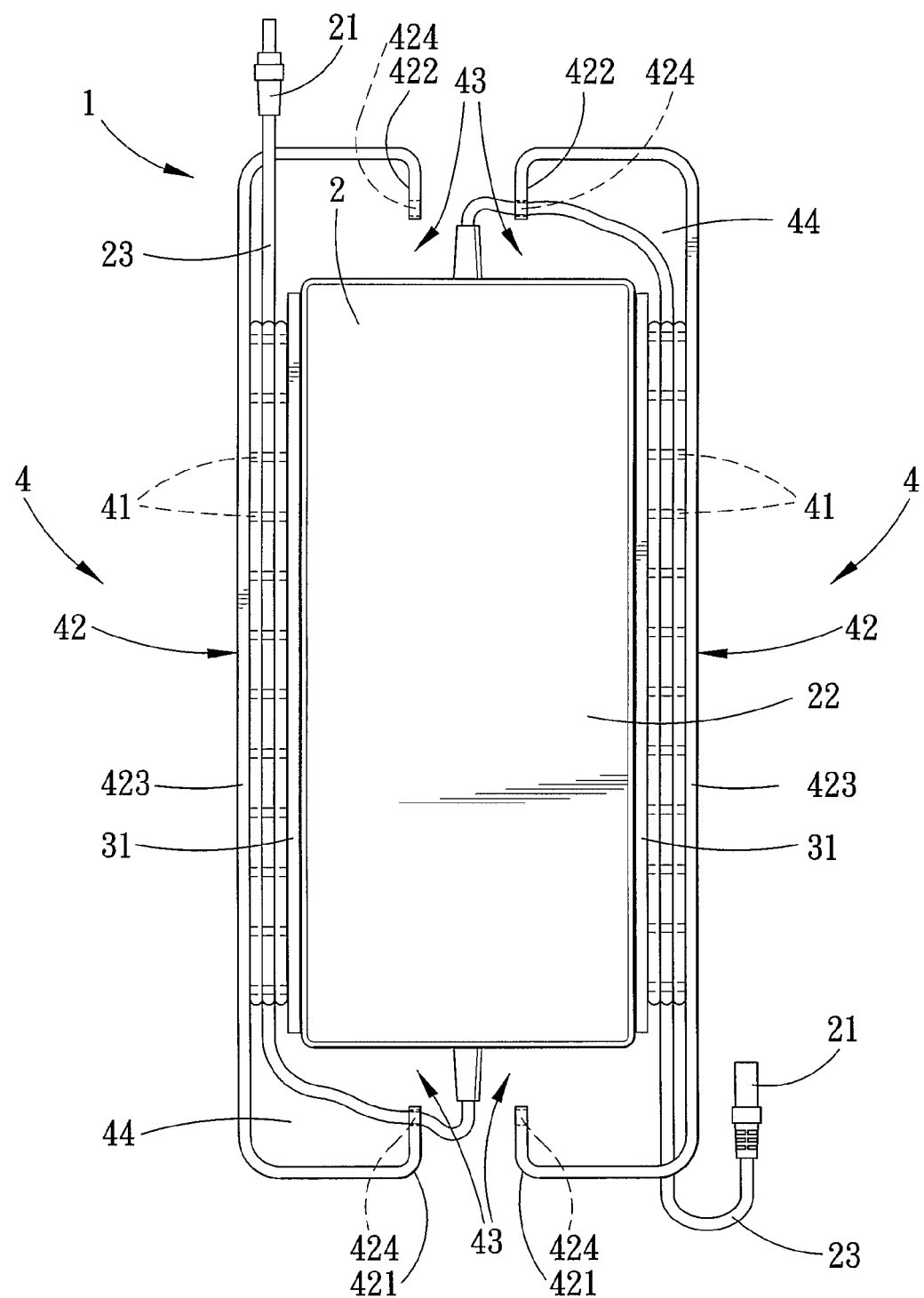
FIG. 2 is a plan view to illustrate the assembly relationship between the first preferred embodiment and an electronic device.

Referring to FIGS. 1 and 2, the first preferred embodiment of a cable organizing device 1 according to the present invention is adapted for use on an electronic device 2 having electric cables, and is shown to include a coupling unit 3 adapted for coupling to the electronic device 2, and two receptacle units 4 connected to the coupling unit 3 for organizing the electric cables of the electronic device 2.

The electronic device 2 in this embodiment is exemplified using a dual-cable power supply which includes two plugs 21, a body 22 having a circuit module (not shown) disposed therein, and two cables 23 connected respectively to front and rear sides of the body 22 and respectively to the plugs 21 such that electrical connection is established between the plugs 21 and the circuit module within the body 22.

The coupling unit 3 in this embodiment is secured onto the body 22 of the electronic device 2 by adhesives, and includes two spaced-apart bridging members 31 and two adhering members 32 disposed between the bridging members 31 and the body 22 to adhere the bridging members 31 to an outer surface of the body 22. In this embodiment, the bridging members 31 are formed from a rubber material, and are adhered to the left and right lateral sides of the body 22, respectively. Certainly, the user may change the positions of the bridging members 31 on the body 22, which should not be limited to the disclosure herein. In addition, the adhering members 32 may be in the form of glue, double-sided adhesives tapes, etc.

Each of the receptacle units 4 is formed from a rubber material, and is connected integrally to one side of the corresponding bridging member 31 that is distal from the body 22 of the electronic device 2. The number of the receptacle units 4 and the bridging members 31 corresponds to that of the cables 23 of the electronic device 2, and is therefore two in this embodiment. Certainly, the number of the receptacle units 4 and the bridging members 31 can be increased or decreased depending on design requirements, and should not be limited to the disclosed embodiment.

Each of the receptacle units 4 includes a plurality of first components 41 arranged spacedly on said one side of the corresponding bridging member 31, and a second component 42 connected to the first components 41 at an angle and spaced apart from the corresponding bridging member 31. Each of the second components 42 has a front end portion 421 and a rear end portion 422 opposite to each other, and an intermediate portion 423 interposed between the front and rear end portions 421, 422.

The intermediate portion 423 of each receptacle unit 4 is substantially C-shaped, is connected to free ends of the first components 41 of the corresponding receptacle unit 4 in a substantially perpendicular relationship, and partly surrounds an outer side of the body 22 of the electronic device 2 in a spaced-apart relationship. The front and rear end portions 421, 422 extend substantially perpendicularly from front and rear sides of the intermediate portion 423 toward the body 22, and are spaced apart from the body 22. To facilitate description, a gap between each of the front and rear end portions 421, 422 and the body 22 is defined herein as a slot 43.

The first components 41 and the second component 42 of each of the receptacle units 4 cooperatively define a stowage region 44 communicated with the corresponding slots 43 and adapted to receive the corresponding cable 23. The first components 41 of the respective receptacle unit 4 cooperatively receive coils of the cable 23 wound thereon. The second component 42 serves as a stop to prevent undesired removal of the wound cable 23 from the stowage region 44.

Figure 3:
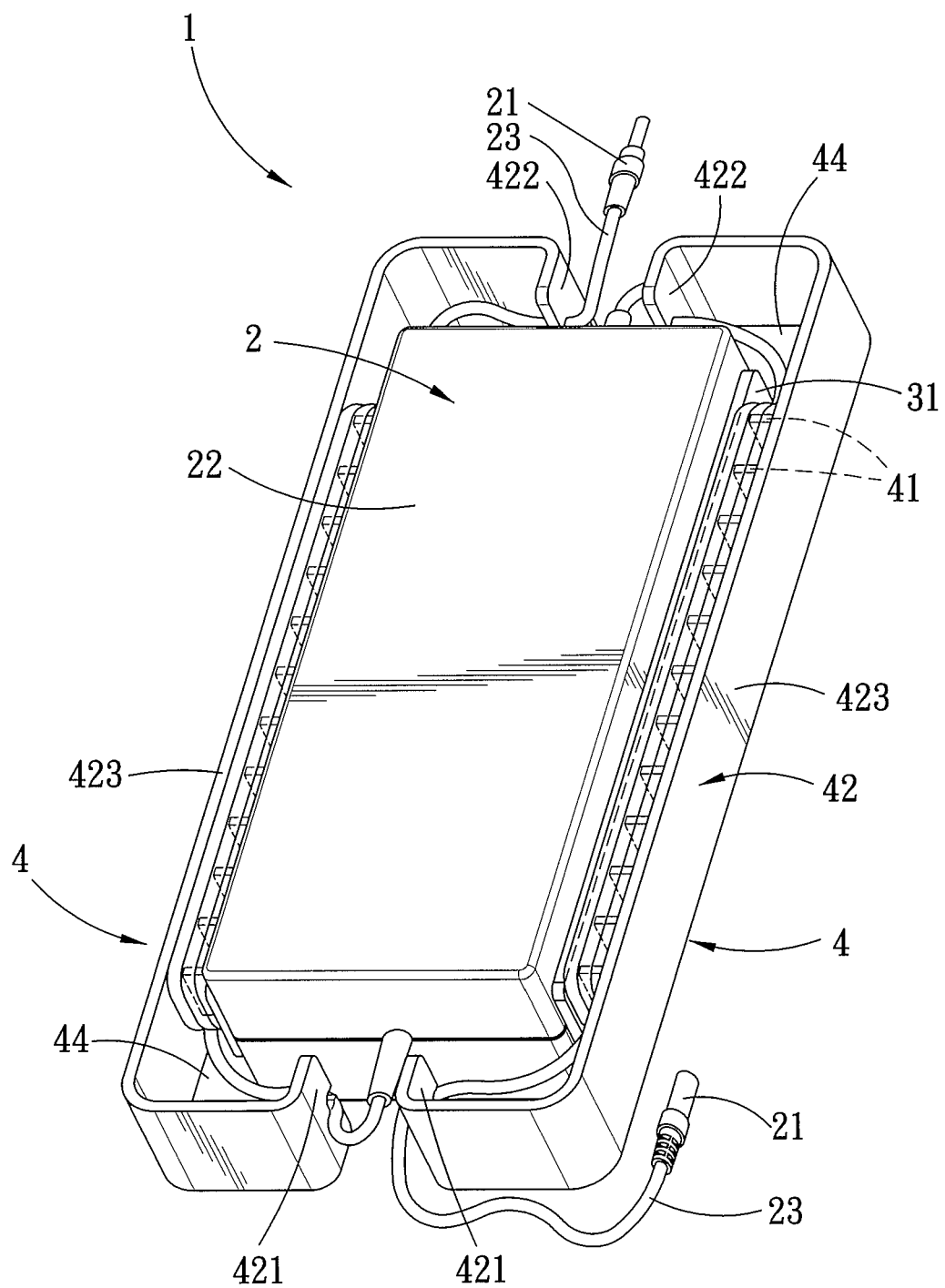
FIG. 3 is an assembled perspective view to further illustrate the assembly relationship between the first preferred embodiment and the electronic device.

In use, with further reference to FIG. 3, the user can selectively extend the cable 23 at the front side of the body 22 of the electronic device 2 through the front slot 43 of the receptacle unit 4 on the left or right side of the body 22 into the stowage region 44 and wind the length of the cable 23 on the first components 41, with the rest of the cable 23 extending through the rear slot 43. In the same manner, the cable 23 at the rear side of the body 22 of the electronic device 2 can be wound on the other side of the body 22.

In addition, in order to maintain the shapes of the wound cables 23 so that the cables 23 will not become loosened due to slight displacement, the cable organizing device 1 of the present invention may further include limiting notches 424 provided respectively in the front and rear end portions 421, 422 of the second component 42 of each of the receptacle units 4 for retaining the corresponding cable 23.

It is noted that the cable organizing device 1 of the present invention is applicable to electronic devices 2 of various sizes since it is adhered to the electronic device 2 by adhesives.

Figure 4:
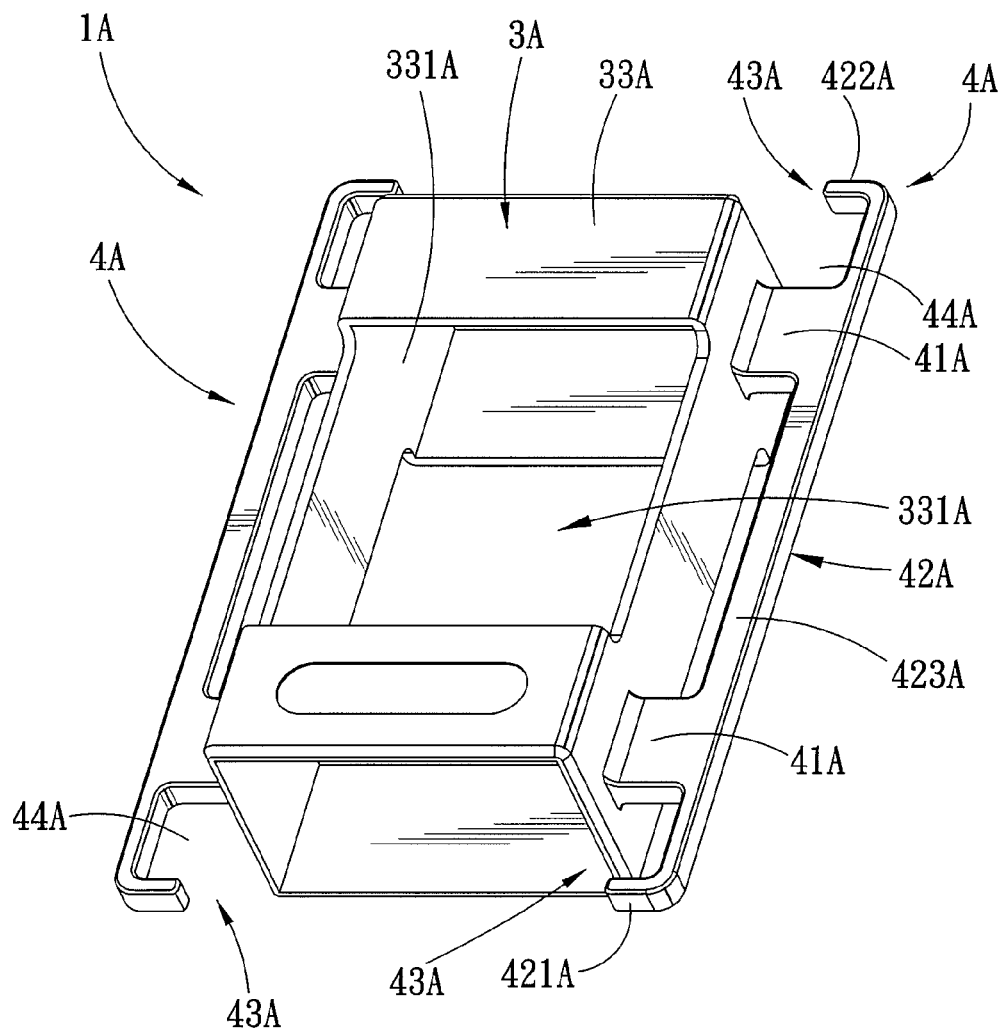
FIG. 4 is a perspective view to illustrate the second preferred embodiment of a cable organizing device according to the present invention.
Figure 5:
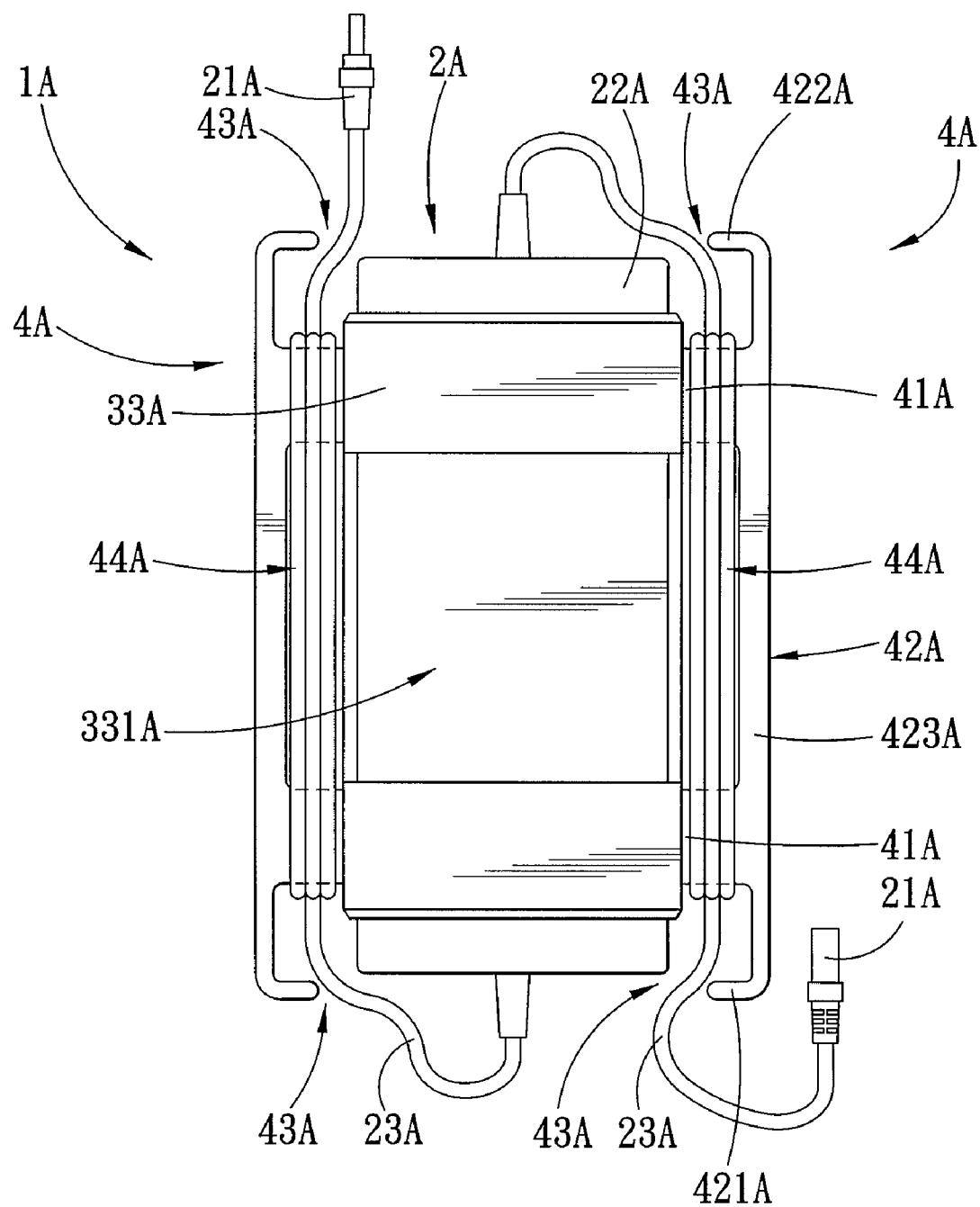
FIG. 5 is a plan view to illustrate the assembly relationship between the second preferred embodiment and an electronic device.

Referring to FIGS. 4 and 5, the second preferred embodiment of a cable organizing device (1A) according to the present invention is adapted for use on an electronic device (2A) with cables, and is shown to include a coupling unit (3A) for coupling to the electronic device (2A), and two receptacle units (4A) connected to the coupling unit (3A) for receiving the cables of the electronic device (2A).

The electronic device (2A) in this embodiment is also exemplified using a dual-cable power supply, which includes two plugs (21A), a body (22A) having a circuit module (not shown) disposed therein, and two cables (23A) connected respectively to front and rear sides of the body (22A) and respectively to the plugs (21A) such that electrical connection is established between the plugs (21A) and the circuit module within the body (22A).

The coupling unit (3A) in this embodiment is formed from a rubber material, is sleeved on the body (22A) of the electronic device (2A), and includes a hollow sleeve (33A) sleeved removably on an outer side of the body (22A), and at least one heat dissipation hole (331A) extending through the hollow sleeve (33A) for dissipation of heat generated by the body (22A). In this embodiment, there are two heat dissipation holes (331A), which are provided in top and bottom sides of the hollow sleeve (33A), respectively, but should not be limited thereto.

Each of the receptacle units (4A) in this embodiment is formed from a rubber material, and is connected integrally to one side of the hollow sleeve (33A) which is distal from the body (22A). The receptacle units (4A) correspond in number to that of the cables (23A), and are provided respectively on left and right sides of the hollow sleeve (33A). Certainly, the number and positions of the receptacle units (4A) may be adjusted according to design requirements, and should not be limited to the disclosure herein.

Each of the receptacle units (4A) includes a pair of first components (41A) arranged spacedly on the corresponding side of the hollow sleeve (33A), and a second component (42A) connected to the first components (41A) at an angle and spaced apart from the hollow sleeve (33A). Each of the second components (42A) has a front end portion (421A) and a rear end portion (422A) opposite to each other, and an intermediate portion (423A) interposed between the front and rear end portions (421A), (422A).

The intermediate portion (423A) has a linear shape, and is connected to free ends of the first components (41A) of the corresponding receptacle unit (4A) in a substantially perpendicular relationship. The front and rear end portions (421A), (422A) extend respectively and substantially perpendicularly from front and rear sides of the intermediate portion (423A) toward the body (22A) of the electronic device (2A), and are spaced apart from the body (22A). To facilitate description, a gap between each of the front and rear end portions (421A), (422A) and the body (22A) is defined herein as a slot (43A).

The first components (41A) and the second component (42A) of each of the receptacle units (4A) cooperatively define a stowage region (44A) communicated with the corresponding slots (43A) and adapted to receive the corresponding cable (23A). The first components (41A) of the respective receptacle unit (4A) cooperatively receive coils of the cable (23A) wound thereon. The second component (42A) serves as a stop to prevent undesired removal of the wound cable (23A) from the stowage region (44A).

Figure 6:
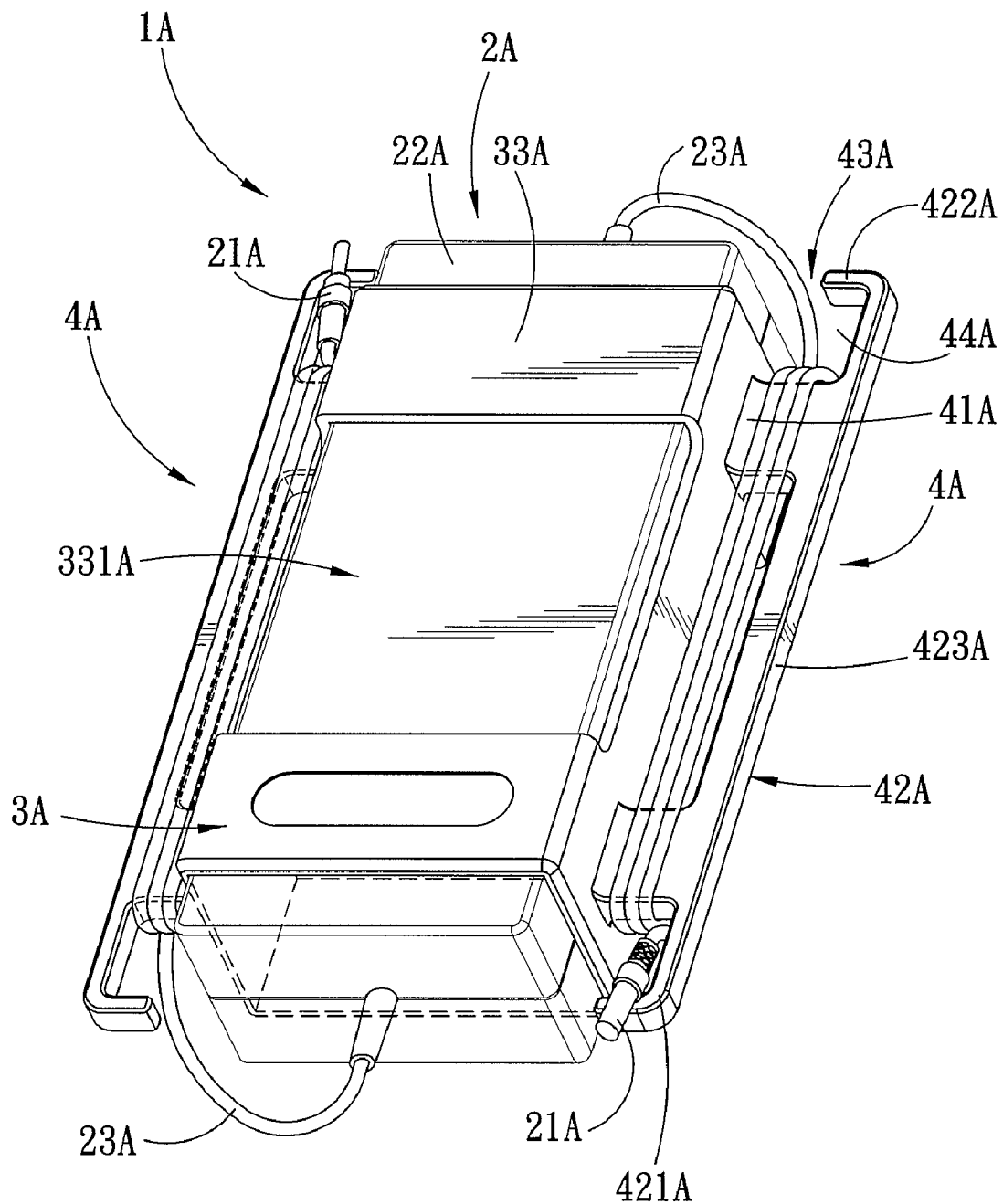
FIG. 6 is an assembled perspective view to further illustrate the assembly relationship between the second preferred embodiment and the electronic device.

In use, with further reference to FIG. 6, the user can selectively extend the cable (23A) at the front side of the body (22A) of the electronic device (2A) through the front slot (43A) of the receptacle unit (4A) on the left or right side of the body (22A) into the stowage region (44A) and wind the length of the cable (23A) on the first components (41A). Preferably, the user can wind the length of the cable (23A) on the first components (41A) until the corresponding plug (21A) is interfered by the second component (42A) and is thus retained in the stowage region (44A), thereby preventing loosening of the cable (23A) due to slight displacement. In the same manner, the cable (23A) of the electronic device (2A) at the rear side of the body (22A) can be wound on the other side of the body (22A).

It is noted that the hollow sleeve (33A) of the coupling unit (3A) is formed from a resilient rubber material, and can thus provide a function of protecting the body (22A) of the electronic device (2A).

Figure 7:
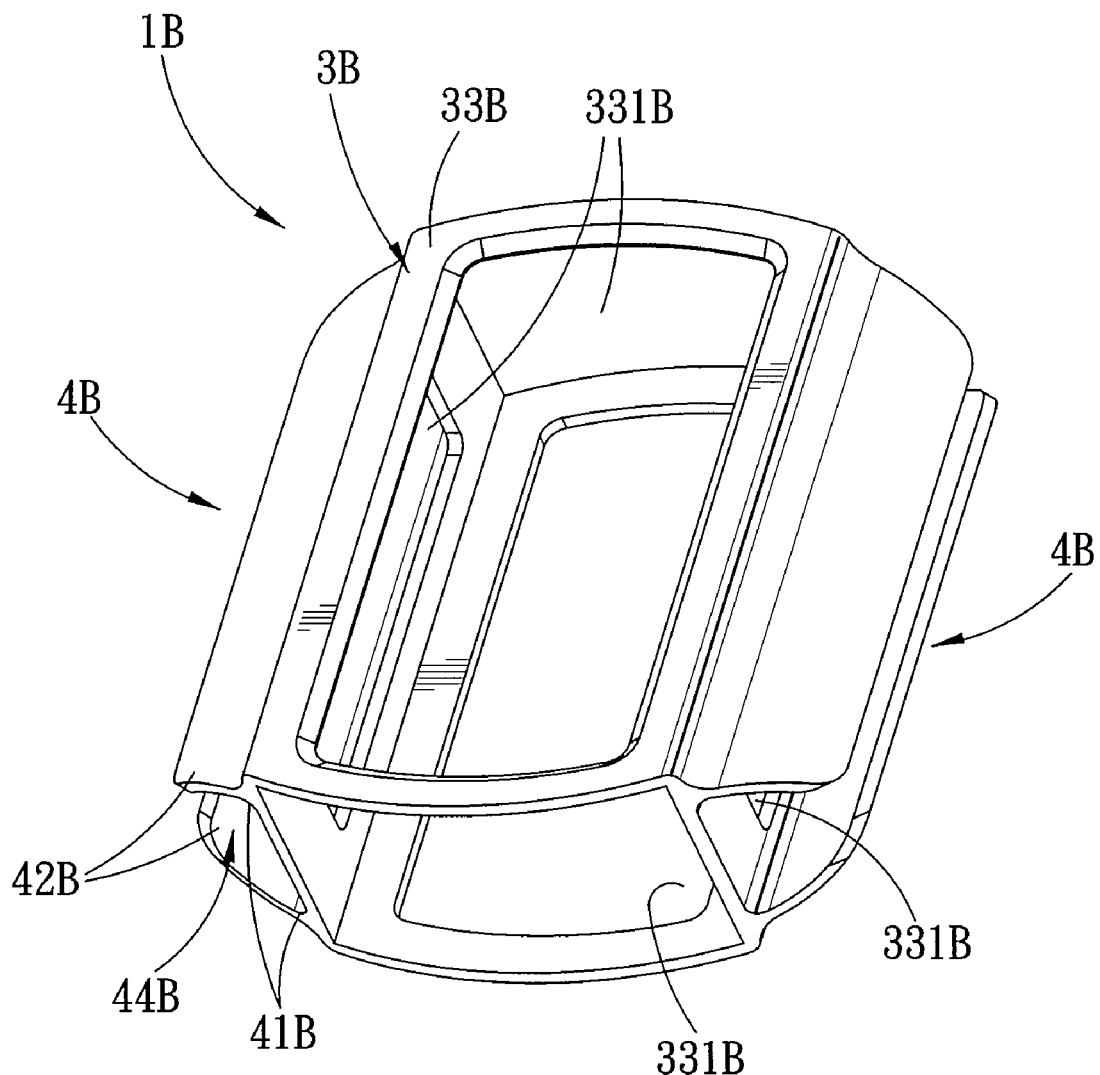
FIG. 7 is a perspective view to illustrate the third preferred embodiment of a cable organizing device according to the present invention.
Figure 8:
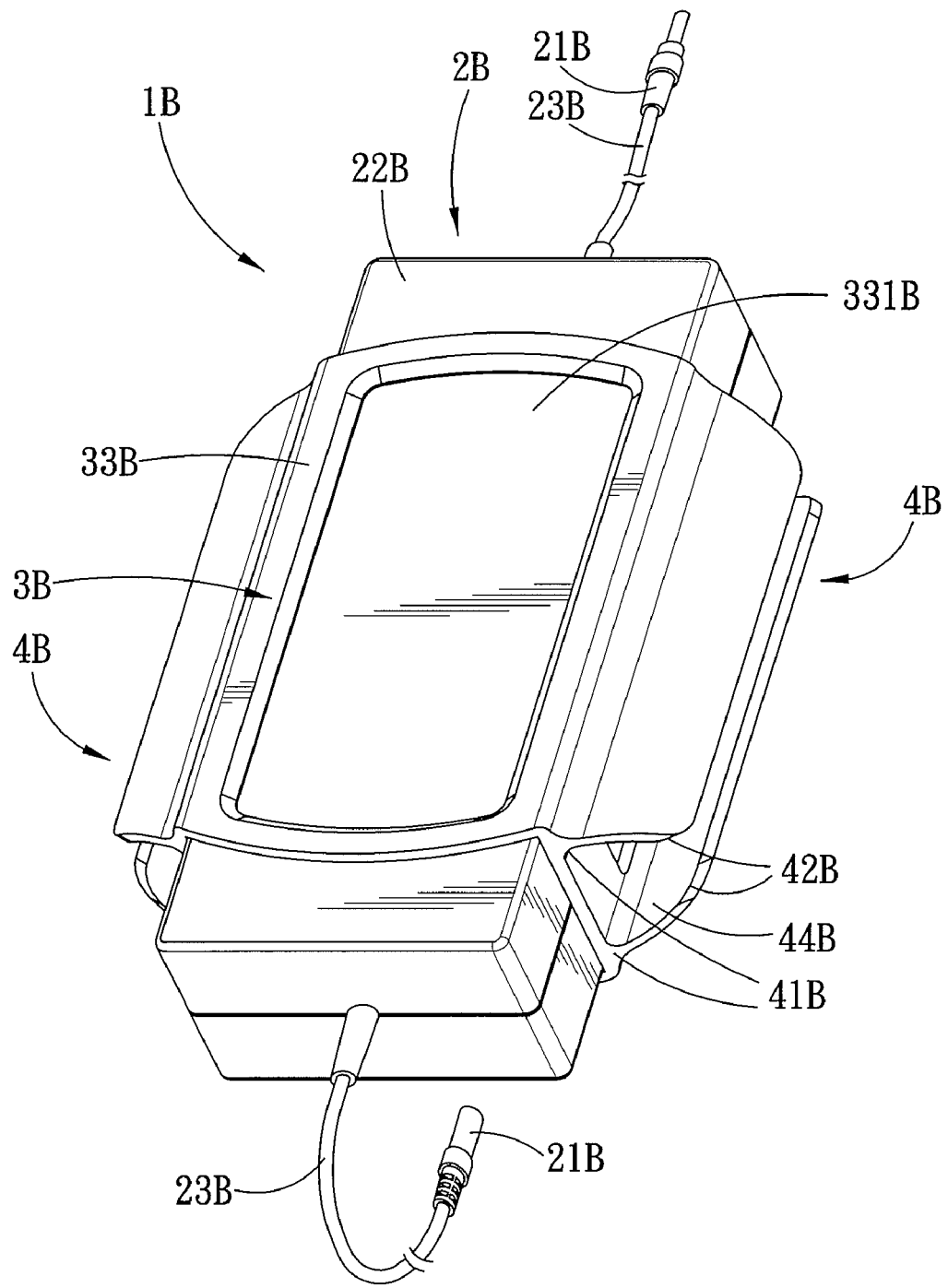
FIG. 8 is an assembled perspective view to illustrate the assembly relationship between the third preferred embodiment and an electronic device.

Referring to FIGS. 7 and 8, the third preferred embodiment of a cable organizing device (1B) according to the present invention is adapted for use on an electronic device (2B) having cables, and is shown to include a coupling unit (3B) for coupling to the electronic device (2B), and two receptacle units (4B) connected to the coupling unit (3B) for receiving the cables of the electronic device (2B).

The electronic device (2B) in this embodiment is also exemplified using a dual-cable power supply, which includes two plugs (21B), a body (22B) having a circuit module (not shown) disposed therein, and two cables (23B) connected respectively to front and rear sides of the body (22B) and respectively to the plugs (21B) such that electrical connection is established between the plugs (21B) and the circuit module within the body (22B).

The coupling unit (3B) in this embodiment is formed from a rubber material, is sleeved on the body (22B) of the electronic device (2B), and includes a hollow sleeve (33B) sleeved removably on an outer side of the body (22B) and capable of protecting the body (22B), and at least one heat dissipation hole (331B) extending through the hollow sleeve (33B) for dissipation of heat generated by the body (22B). In this embodiment, there are four heat dissipation holes (331B), which are provided in top, bottom, left and right sides of the hollow sleeve (33B), respectively, but should not be limited thereto.

Each of the receptacle units (4B) in this embodiment is formed from a rubber material, and is connected integrally to one side of the hollow sleeve (33B) that is distal from the body (22B). The receptacle units (4B) correspond in number to that of the cables (23B), and are provided respectively on left and right sides of the hollow sleeve (33B). Certainly, the number and positions of the receptacle units (4B) may be adjusted according to design requirements, and should not be limited to the disclosure herein.

Each of the receptacle units (4B) includes two first components (41B) arranged on the corresponding side of the hollow sleeve (33B) in a top-and-bottom relationship, and two second components (42B) connected respectively to free ends of the first components (41B) at an angle and spaced apart from the hollow sleeve (33B). Each of the second components (42B) has a distal end oriented toward the distal end of the other one of the second components (42B).

The first components (41B) and the second components (42B) of the respective receptacle unit (4B) cooperatively define a stowage region (44B) for receiving one of the cables (23B). The second components (42B) cooperatively clamp said one of the cables (23B) and the corresponding plug (21B) in the stowage region (44B) to thereby prevent undesired removal thereof from the stowage region (44B).

Figure 9:
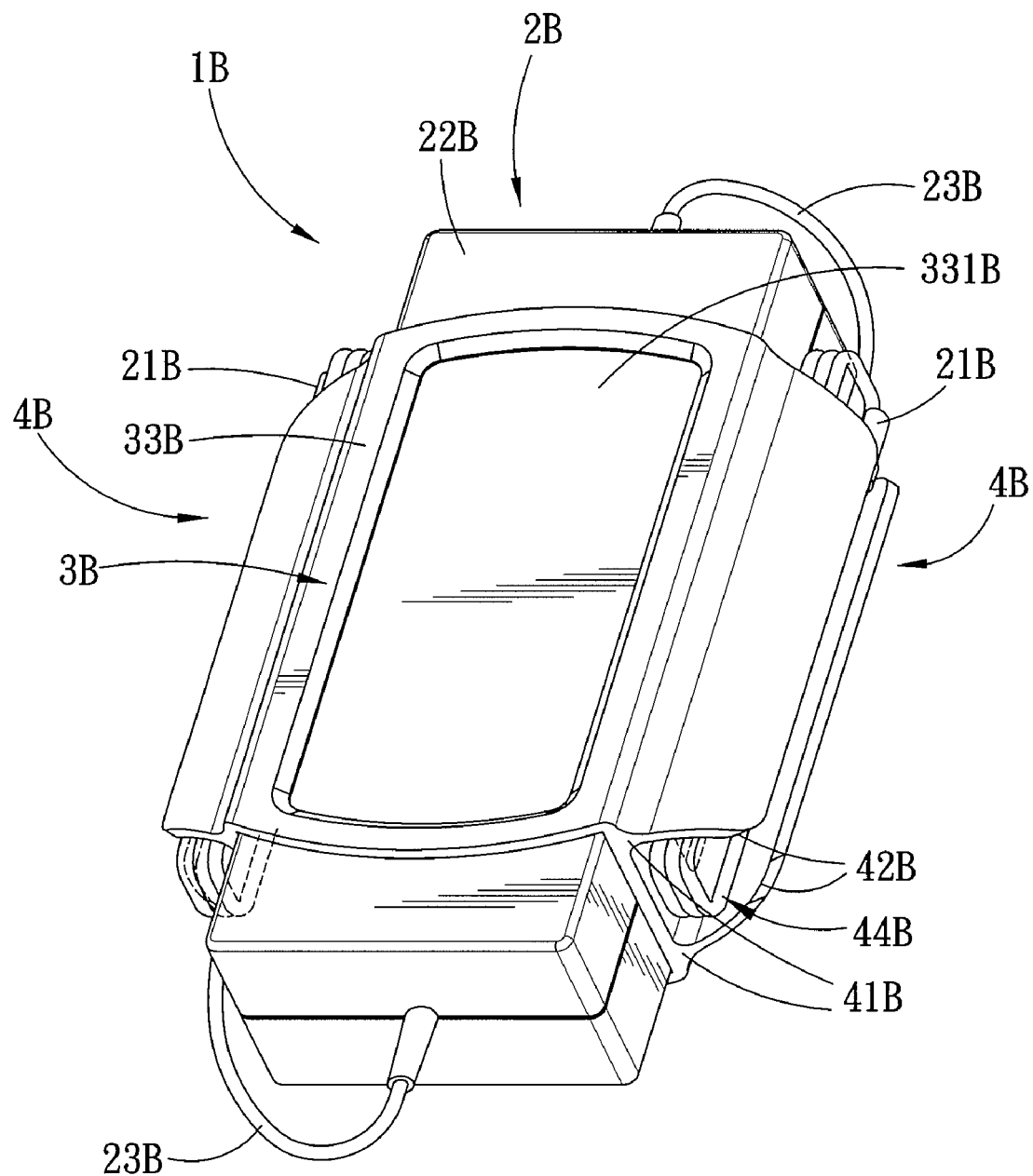
FIG. 9 is another assembled perspective view to illustrate how a plug of the electronic device is stowed in a stowage region of the third preferred embodiment.

In operation, with reference to FIG. 9, one of the cables (23B) is wound into a bundle of a suitable length and is squeezed into one of the stowage regions (44B) together with the plug (21B) thereof to be clamped and retained by the two corresponding second components (42B). In the same manner, the other one of the cables (23B) and the plug (21B) thereof are put away in the other one of the stowage regions (44B).

It is noted that, since the hollow sleeve (33B) of the coupling unit (3B) is formed from a resilient rubber material, it also has the function of protecting the body (22B) of the electronic device (2B).

Figure 10:
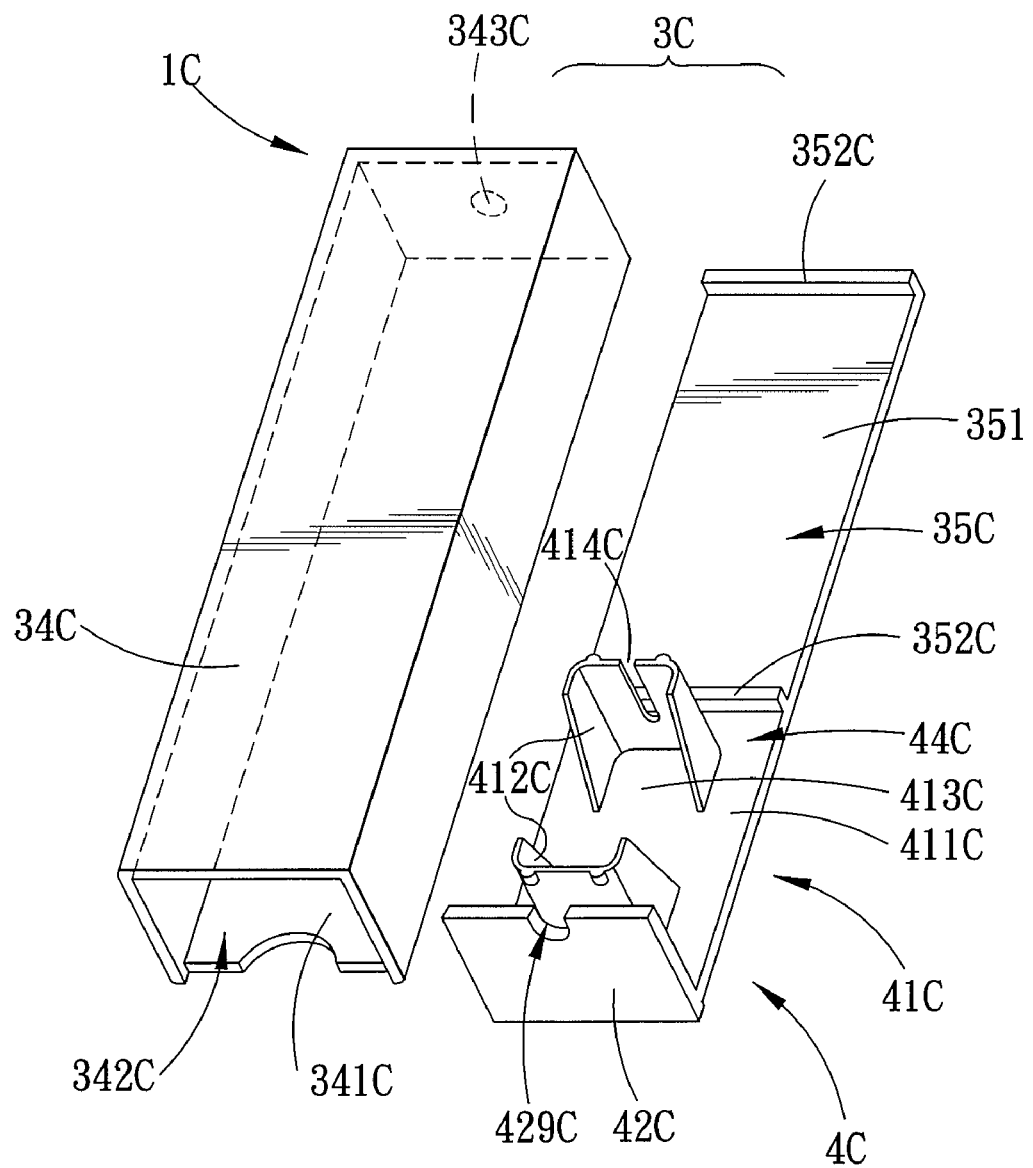
FIG. 10 is an exploded perspective view to illustrate the fourth preferred embodiment of a cable organizing device according to the present invention.
Figure 11:
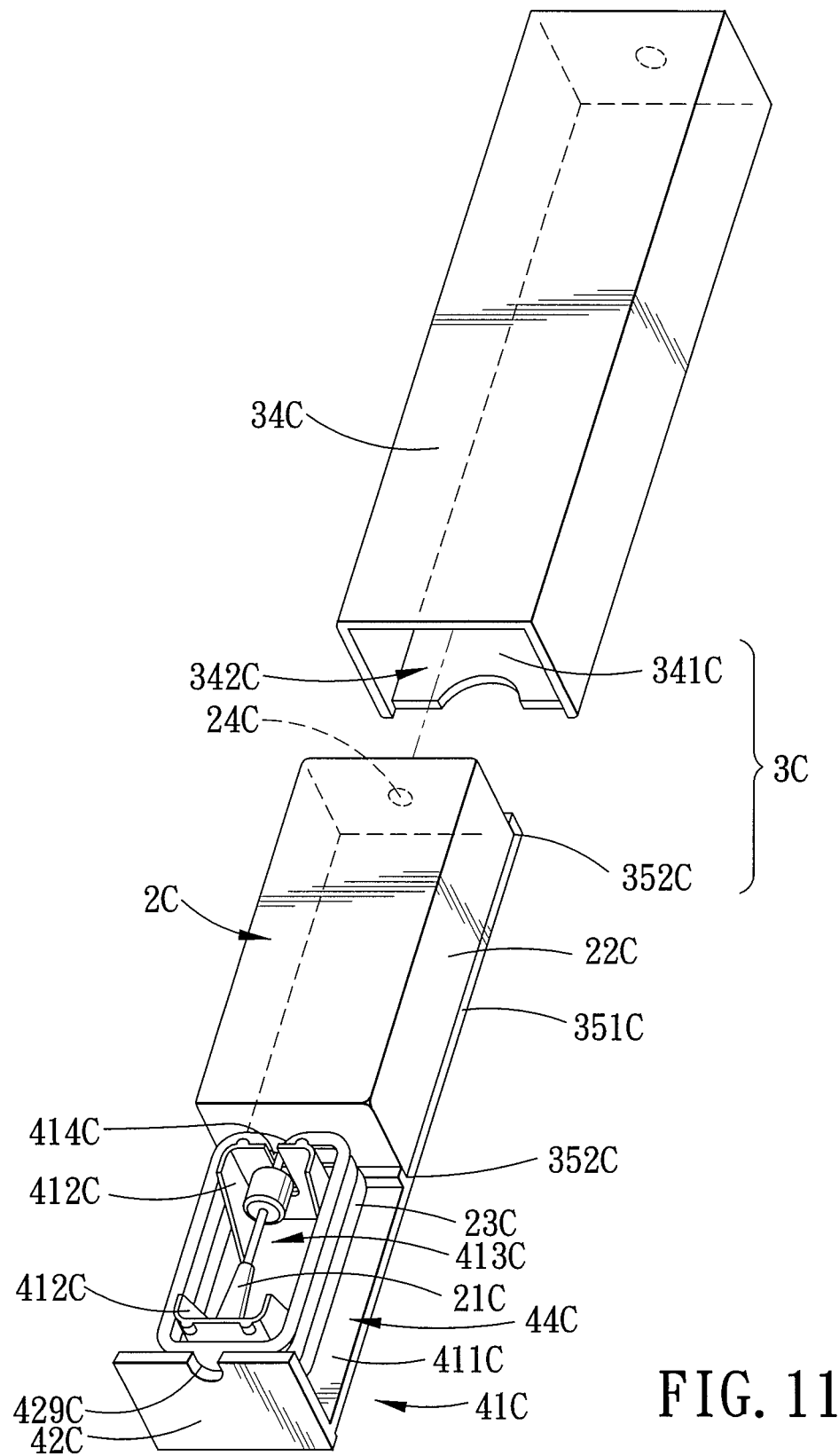
FIG. 11 is another exploded perspective view to illustrate the assembly relationship between the fourth preferred embodiment and an electronic device.
Figure 12:
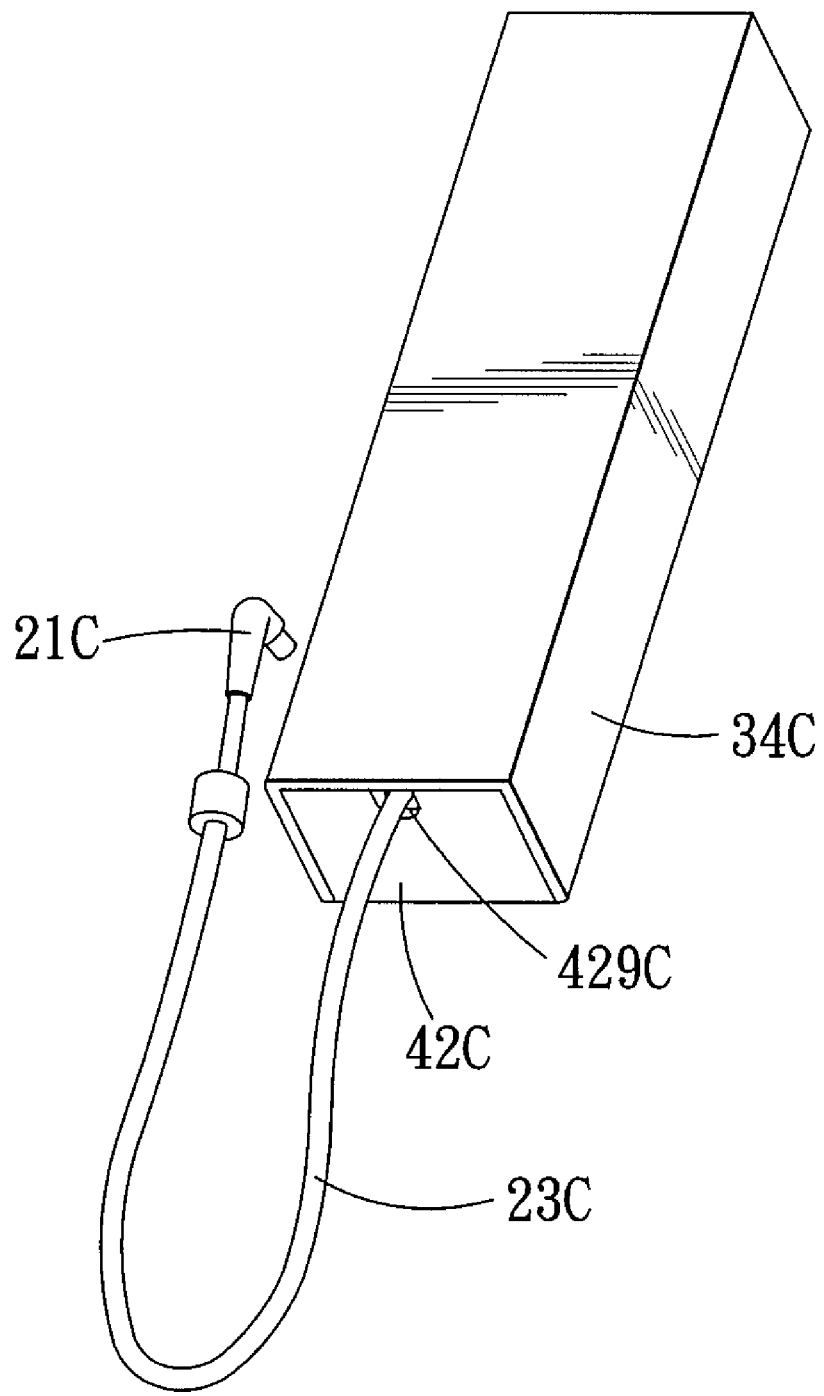
FIG. 12 is an assembled perspective view showing that a plug of the electronic device is exposed on the outside of a second component of the fourth preferred embodiment.

Referring to FIGS. 10, 11 and 12, the fourth preferred embodiment of a cable organizing device (1C) according to the present invention is adapted for use on an electronic device (2C) with a cable, and is shown to include a coupling unit (3C) for coupling to the electronic device (2C), and a receptacle unit (4C) connected to the coupling unit (3C) for receiving the cable.

The electronic device (2C) is exemplified as a single cable power supply in this embodiment, and includes a plug (21C), a body (22C) having a circuit module (not shown) disposed therein, a cable (23C) connected to the plug (21C) and a front side of the body (22C) so as to establish electrical connection between the plug (21C) and the circuit module in the body (22C), and a plug hole (24C) provided in a rear side of the body (22C) for insertion of an additional plug (not shown) to be connected electrically to the circuit module in the body (22C).

The coupling unit (3C) in this embodiment is disposed to receive the electronic device (2C), and includes a casing (34C) defining a receiving space (341C) for receiving the body (22C), and a carrier seat (35C) received and slidable in the receiving space (341C).

The carrier seat (35C) has a plate body (351C) for supporting the body (22C) of the electronic device (2C), and two stop ribs (352C) projecting respectively from front and rear edges of the plate body (351C). In this embodiment, the stop ribs (352C) are spaced apart by a distance corresponding to a front-to-rear length of the body (22C) of the electronic device (2C) so as to limit forward and rearward displacement of the body (22C).

The casing (34C) has an opening (342C) formed in a front side of the casing (34C) and communicated with the receiving space (341C), and an insertion hole (343C) formed in a rear side of the casing (34C) and communicated with the receiving space (341C). The position of the insertion hole (343C) corresponds to that of the plug hole (24C) in the electronic device (2C) to permit extension of the additional plug (not shown) therethrough to engage the plug hole (24C) in the electronic device (2C).

The receptacle unit (4C) includes a first component (41C) connected integrally to a front side of the coupling unit (3C), and a second component (42C) connected to the first component (41C) at an angle and spaced apart from the carrier seat (35C). The first and second components (41C), (42C) cooperatively define a stowage region (44C) for receiving the cable (23C).

The first component (41C) has an extension portion (411C) connected integrally to the plate body (351C), and a spool portion (412C) projecting from the extension portion (411C) for winding of the cable (23C) thereon. The spool portion (412C) has a chamber (413C) in the center thereof for receiving the plug (21C), and a limiting notch (414C) provided in a top end thereof and communicated with the chamber (413C) for engaging the cable (23C) so as to prevent loosening of the cable (23C) due to slight displacement. In this embodiment, the spool portion (412C) is formed into two separate parts that project from a top side of the extension portion (411C), but can also be formed integrally as one piece, without being limited to the disclosure herein.

The second component (42C) is connected to a free end of the extension portion (411C) of the first component (41C), and can close the opening (342C) in the casing (34C) to thereby stop undesired removal of the wound cable (23C) from the stowage region (44C). The second component (42C) has a through hole (429C) extending therethrough and communicated with the stowage region (44C) for extension of the cable (23C) therethrough. In this embodiment, the through hole (429C) is disposed in a top edge of the second component (42C).

During assembly, the body (22C) of the electronic device (2C) is placed on the plate body (351C) of the carrier seat (35C) such that displacement thereof is limited by the stop ribs (352C). Then, the length of the cable (23C) is wound around the spool portion (412C), with the rest of the cable (23C) retained in the limiting notch (414C), and with the plug (21C) stowed in the chamber (413C). Finally, the carrier seat (35C) together with the first component (41C) is slid into the receiving space (341C) such that the second component (42C) closes the opening (342C) in the casing (34C).

In use, it is necessary to pull the second component (42C) together with the first component (41C) and the carrier seat (35C) forward and to subsequently remove the plug (21C) together with the cable (23C) so that the plug (21C) is removed from the chamber (413C), and the cable (23C) is removed from the limiting notch (414C) Next, the wound cable (23C) is unwound to a suitable length and is extended through the through hole (429C), thereby exposing the plug (21C) on the outside of the second component (42C). Thereafter, the second component (42C) together with the first component (41C) and the carrier seat (35C) is slid into the receiving space (341C) such that the second component (42C) closes the opening (342) in the casing (34C).

Figure 13:
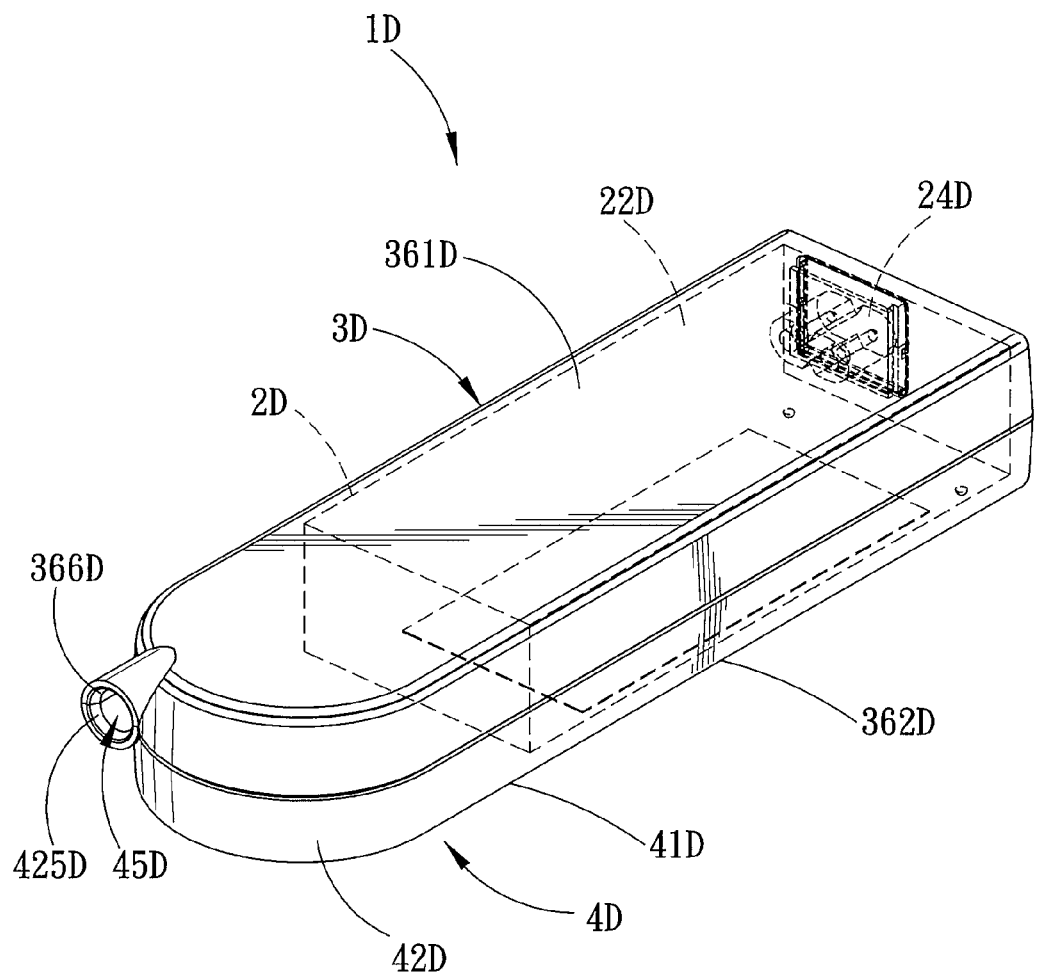
FIG. 13 is an assembled perspective view to illustrate the fifth preferred embodiment of a cable organizing device according to the present invention.
Figure 14:
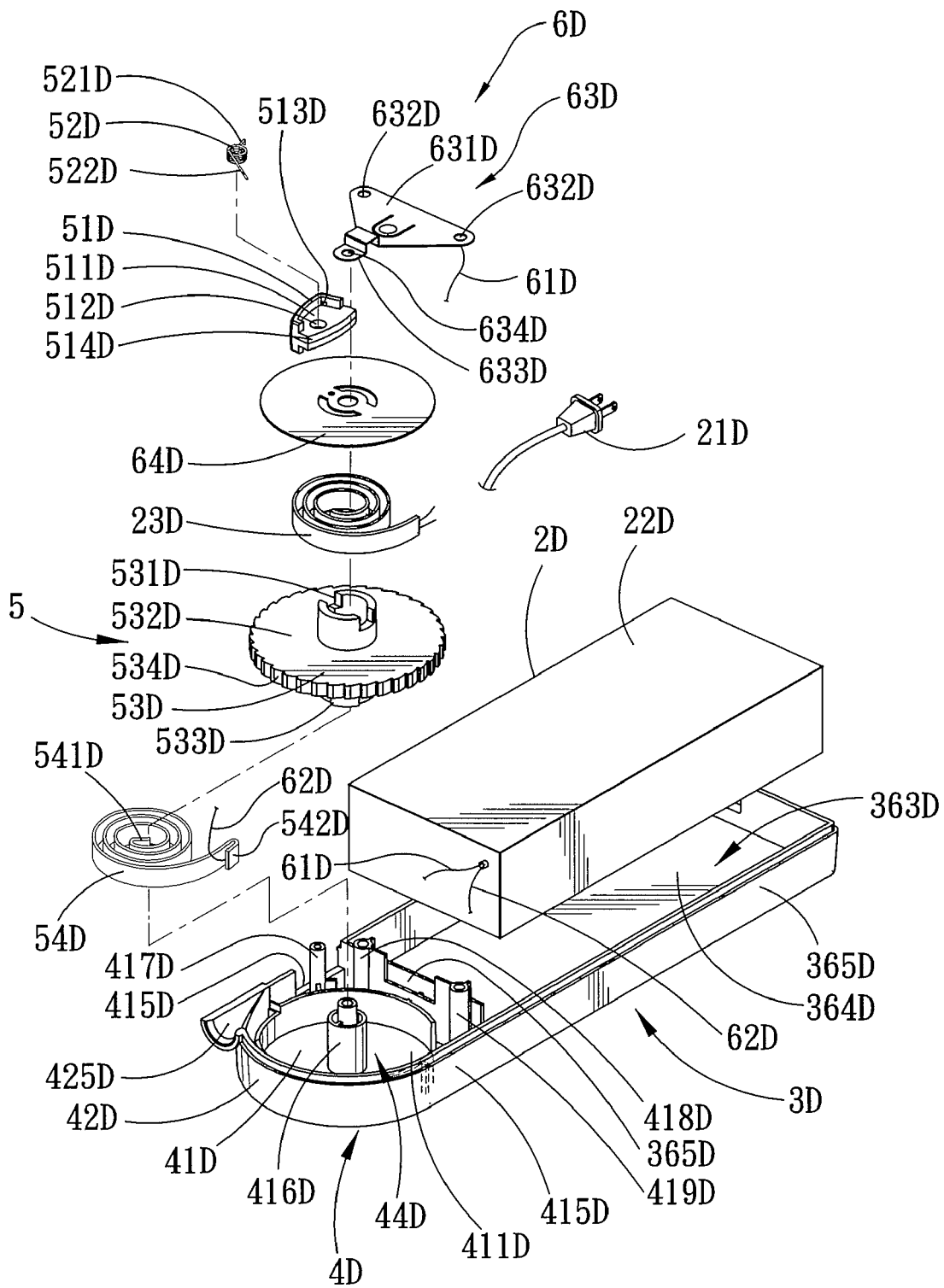
FIG. 14 is an exploded perspective view of the fifth preferred embodiment in part.

It is noted that the receiving space (341C) is provided to receive the entire electronic device (2C) so as to result in a neat appearance Referring to FIGS. 13 and 14, the fifth preferred embodiment of a cable organizing device (1D) according to the present invention is adapted for use on an electronic device (2D) with a cable, and includes a coupling unit (3D) adapted to be coupled to the electronic device (2D), and a receptacle unit (4D) connected to the coupling unit (3D) for receiving the cable of the electronic device (2D).

The electronic device (2D) is exemplified as a single cable power supply in this embodiment, and includes a plug (21D), a body (22D) having a circuit module (not shown) disposed therein, a cable (23D) for establishing electrical connection between the plug (21D) and the circuit module in the body (22D), and a plug hole (24D) disposed in a rear side of the body (22D) for insertion of an additional plug (not shown) to be connected electrically to the circuit module in the body (22D).

The coupling unit (3D) in this embodiment is also disposed to receive the electronic device (2D), and includes a first coupling member (361D) and a second coupling member (362D) that are secured together to define a receiving space (363D) for receiving the body (22D) of the electronic device (2D).

The first coupling member (361D) has an insertion hole (366D) extending through a front end thereof and communicated with the receiving space (363D). The second coupling member (362D) has a base plate (364D) for supporting the body (22D) of the electronic device (2D), and a surrounding plate (365D) surrounding the base plate (364D).

The receptacle unit (4D) includes a first component (41D) connected to a front side of the second coupling member (362D) of the coupling unit (3D), and a second component (42D) connected to the first component (41D) at an angle and spaced apart from the second coupling member (362D). The first and second components (41D), (42D) cooperatively define a stowage region (44D) for receiving the cable (23D) and communicated with the receiving space (363D).

The first component (41D) has an extension portion (411D) connected to the base plate (364D) of the second coupling member (362D), and two partition portions (415D) disposed spacedly on two opposite sides of the extension portion (411D) and connected to the surrounding plate (365D).

The second component (42D) is connected to the extension portion (411D) of the first component (41D) and free ends of the partition portions (415D) for preventing undesired removal of the stowed cable (23D) from the stowage region (44D). The second component (42D) has an insertion hole (425D) extending through a front end thereof and communicated with the stowage region (44D) and the insertion hole (366D) in the first coupling member (361D). The insertion hole (425D) cooperates with the insertion hole (366D) in the first coupling member (361D) to define an outlet (45D) for extension of the cable (23D).

In order that the cable (23D) can be wound automatically so as to provide better user convenience, this embodiment further includes a winding unit (5D) mounted on the receptacle unit (4D).

To accommodate the winding unit (5D), the first component (41D) of the receptacle unit (4D) further includes a first spool portion (416D) projecting from and disposed centrally of the extension portion (411D), a second spool portion (417D) disposed on the left side, and a first post (418D) projecting from the extension portion (411D) and connected to the surrounding plate (365D).

The winding unit (5D) includes a control member (51D), a torsional member (52D), a transmission member (53D), and a resilient member (54D).

Figure 15:
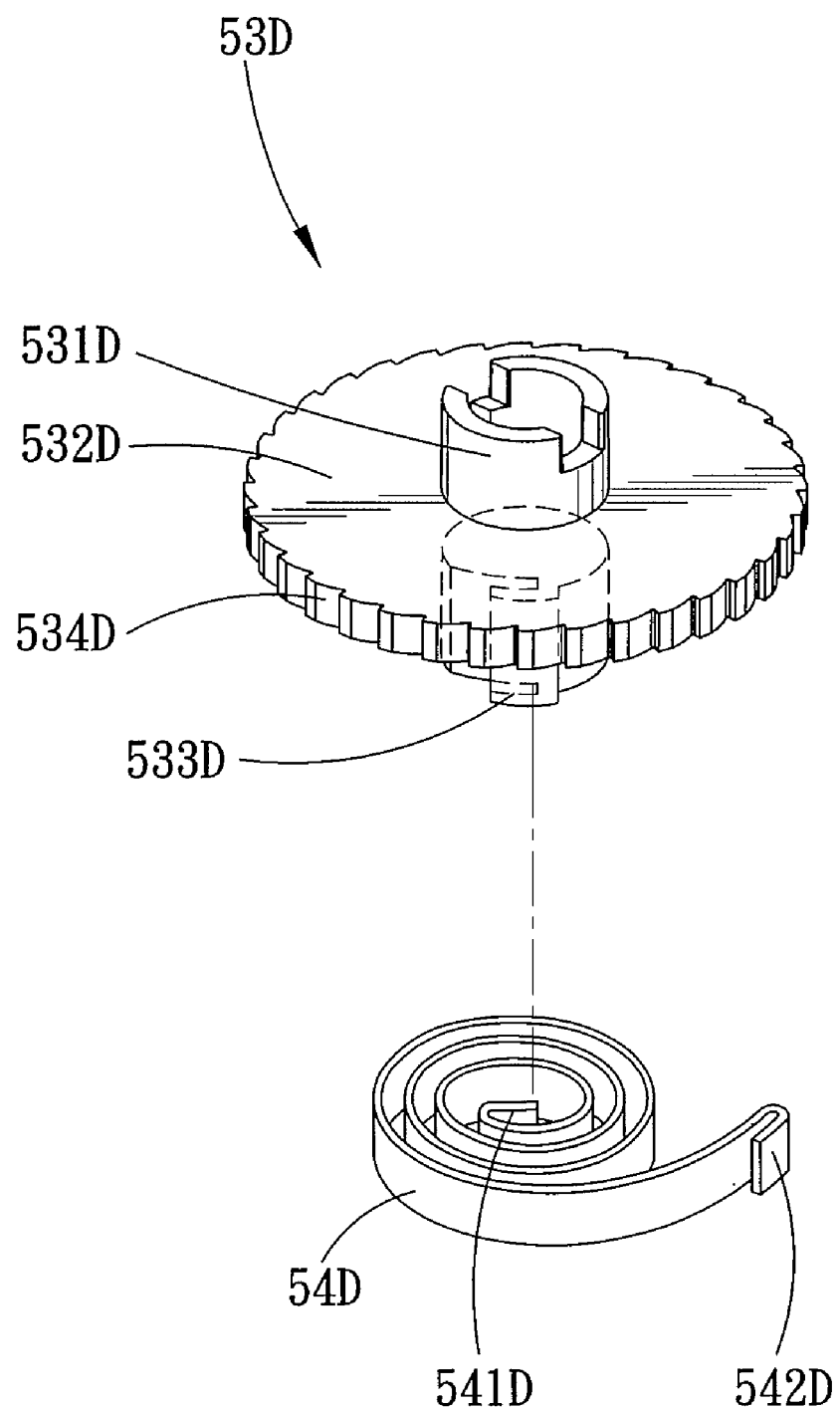
FIG. 15 is an exploded perspective view to illustrate a transmission member and a resilient member of the fifth preferred embodiment.
Figure 16:
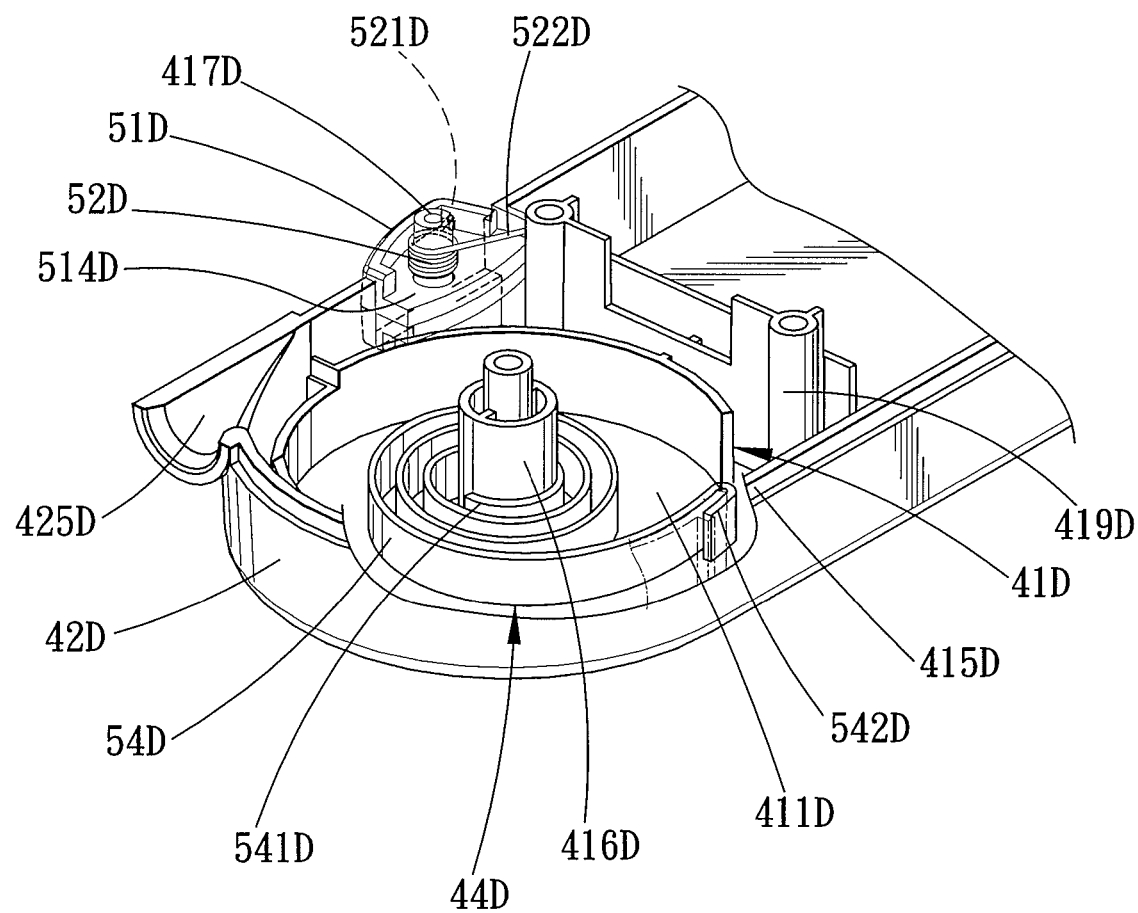
FIG. 16 is a fragmentary assembled perspective view to illustrate the assembly relationship of the fifth preferred embodiment.

With reference to FIGS. 15 and 16, the transmission member (53D) has a tubular body (531D) fitted around the first spool portion (416D) for winding of the cable (23D) thereon, and a ratchet wheel portion (532D) surrounding the tubular body (531D). The tubular body (531D) has a notch (533D) provided below the ratchet wheel portion (532D). The ratchet wheel portion (532D) has a plurality of teeth (534D) formed in an outer peripheral surface thereof.

The control member (51D) is fitted around the second spool portion (417D), and includes a control body (511D), a through hole (512D) extending through the control body (511D) for passage of the second spool portion (417D), and a dent (513D) in the control body (511D). The control body (511D) has an abutting end (514D) corresponding to one of the teeth (534D) in position so as to generate interference therewith for purposes of positioning.

The torsional member (52D) in this embodiment is a torsion spring to enable the control member (51D) to constantly interfere with the corresponding one of the teeth (534D), and has a first end (521D) and a second end (522D) opposite to each other. The first end (521D) is inserted into the dent (513D) of the control member (51D), and the second end (522D) is abutted by both the first post (418D) and the surrounding plate (365D) and is thus prevented from moving.

The resilient member (54D) in this embodiment is a helical spring to provide a restoring force to rewind the cable (23D) exposed from the outlet (45D). The resilient member (54D) is fitted around the tubular body (531D), is disposed below the ratchet wheel portion (532D), and has a center end (541D) inserted into the notch (533D), and an outer end (542D) secured to the first component (41D).

In assembly, the body (22D) of the electronic device (2D) is placed on the base plate (364D) of the second coupling member (362D) such that the body (22D) is limited by the surrounding plate (365D) and is thus prevented from moving. Then, the length of the cable (23D) is wound around the tubular body (531D) of the transmission member (53D), with the rest of the cable (23D) extending through the outlet (45D) such that the plug (21D) is exposed from the outlet (45D). Subsequently, the first and second coupling members (361D), (362D) are secured together.

In use, when it is desired to pull out the cable (23D) the control member (51D) is pressed such that the abutting end (514D) clears the corresponding tooth (534D). At this time, the torsional member (52D) is in a tensed state so as to acquire a restoring force. Then, by pulling out a suitable length of the cable (23D), the transmission member (53D) will rotate about the first spool portion (416D), and the resilient member (54D) is in a tensed state and acquires a restoring force. When the control member (51D) is released, the restoring force of the torsional member (52D) will bring the abutting end (514D) of the control member (51D) to enter and engage a corresponding one of the teeth (534D).

When it is desired to rewind the cable (23D), it is merely necessary to press the control member (51D) once again so that the abutting end (514D) thereof clears the corresponding one of the teeth (534D). At this time, the torsional member (52D) is in a tensed state so as to acquire a restoring force. Then, by means of the restoring force of the resilient member (54D), the transmission member (53D) can be rotated to pull back the exposed length of the cable (23D). When the control member (51D) is released, the restoring force of the torsional member (52D) will bring the abutting end (514D) of the control member (51D) to enter and engage a corresponding one of the teeth (534D).

Figure 17:
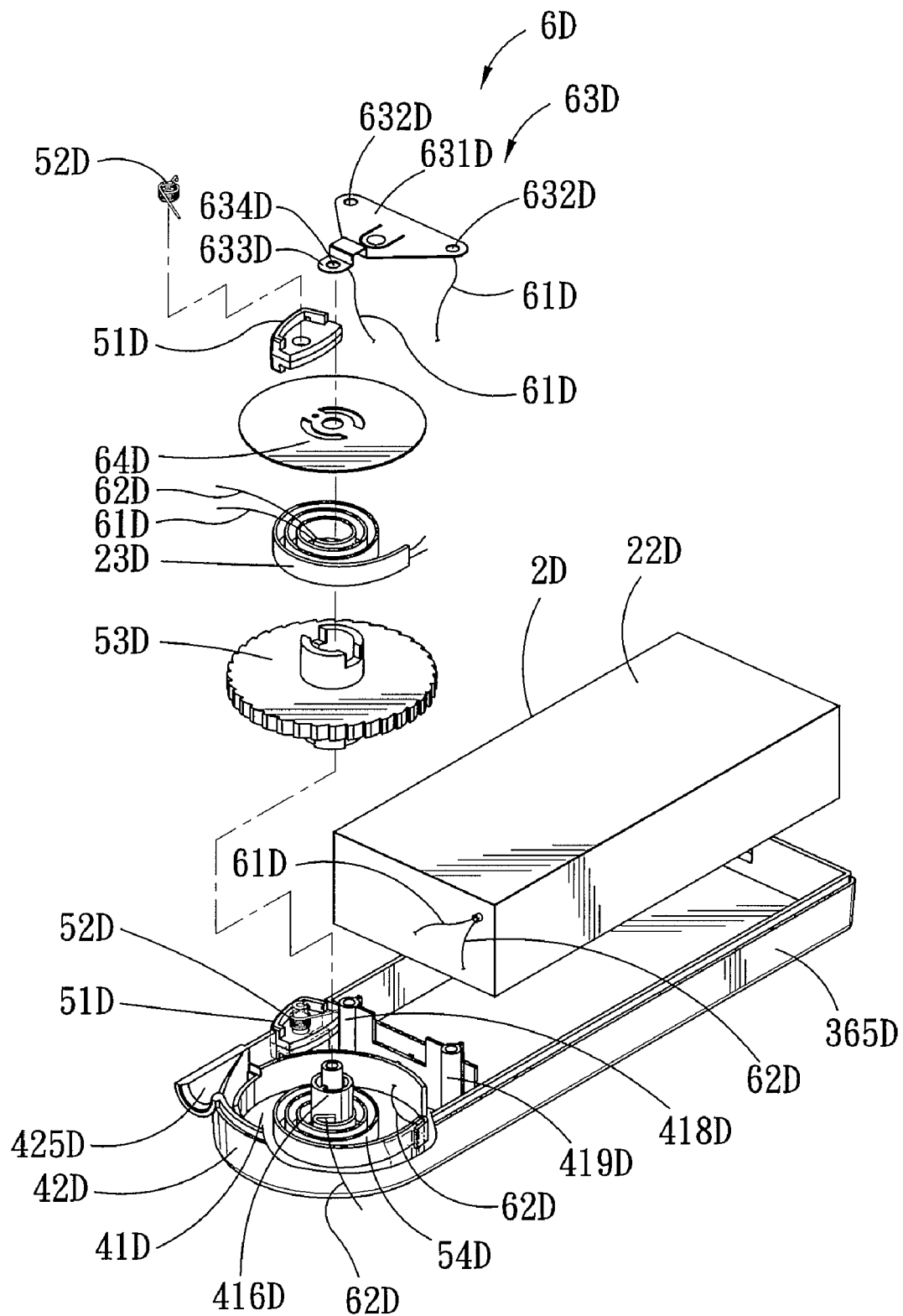
FIG. 17 is a fragmentary exploded perspective view to illustrate an electrically conductive unit of the fifth preferred embodiment.

Referring to FIG. 17, in order to prevent entangling of the cable (23D) during winding in case of a twin cable, this embodiment further includes an electrically conductive unit (6D) disposed between the body (22D) of the electronic device (2D) and the cable (23D), and including two first lead wires (61D) and two second lead wires (62D) of differing polarities, a conductive resilient member (63D), and an electrically conductive member (64D).

To accommodate the conductive unit (6D), the first component (41D) further includes a second post (419D) projecting from the extension portion (411D), connected to the surrounding plate (365D), and spaced apart from the first post (418D).

The electrically conductive member (64D) is fitted on the first spool portion (416D) and the tubular body (531D) of the transmission member (53D), and is disposed above the wound cable (23D).

The conductive resilient member (63D) includes a conductive body (631D) disposed above the electrically conductive member (64D), two spaced-apart fitting holes (632D) extending through the conductive body (631D) to receive the first post (418D) and the second post (419D), respectively, a resilient portion (633D) with a continuous bend and connected to one side of the conductive body (631D) to be in contact with the electrically conductive member (64D), and a through hole (634D) extending through the resilient portion (633D) to receive the first spool portion (416D).

One of the first lead wires (61D) is connected to the conductive resilient member (63D) and the body (22D) of the electronic device (2D), whereas the other of the first lead wires (61D) is connected to a corresponding one of the cable parts of the cable (23D) and the conductive resilient member (63D), thereby establishing electrical connection between the cable (23D) and the circuit module in the body (22D).

One of the second lead wires (62D) is connected to the body (22D) and the resilient member (54D), whereas the other one of the second lead wires (62D) is connected to the resilient member (54D) and the cable (23D), thereby establishing electrical connection between the cable (23D) and the circuit module in the body (22D).

It is noted that this embodiment provides the receiving space (363D) for receiving the entire electronic device (2D) so as to result in a neat appearance.

In sum, through the coupling unit that cooperates with the receptacle unit, the cable organizing device according to the present invention permits easy and convenient stowage of the cable(s) of the electronic device.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A cable organizing device adapted for use on an electronic device that includes a body, a plug, and a cable connected to the body and the plug so as to establish electrical connection therebetween, said cable organizing device comprising:
   a coupling unit adapted to be secured to the body of the electronic device; and
   a receptacle unit including a first component connected to one side of said coupling unit that is distal from the body of the electronic device, and a second component connected to said first component at an angle and spaced apart from said coupling unit, said first and second components cooperatively defining a stowage region adapted to stow the cable, said second component being provided to prevent undesired removal of the stowed cable from said stowage region,
   wherein said receptacle unit includes two of said first components, said first components being arranged spacedly on said one side of said coupling unit that is distal from the body of the electronic device so as to be adapted for winding of the cable thereon;
   said second component being spaced apart from said coupling unit and having a front end portion and a rear end portion opposite to each other, and an intermediate portion interposed between said front and rear end portions and connected to free ends of said first components;
   said first and second components cooperatively defining said stowage region adapted to stow the cable, said second component being adapted to prevent undesired removal of the cable from said stowage region.

2. The cable organizing device according to claim 1, wherein said coupling unit has a bridging member connected to at least one of said first components, and an adhering member adapted to be disposed between said bridging member and the body of the electronic device and adapted to adhere said cable organizing device to an outer surface of the body of the electronic device.

3. The cable organizing device according to claim 1, wherein one of said front and rear end portions of said second component extends substantially perpendicularly from one side of said intermediate portion toward the body of the electronic device so as to limit one of the cable and the plug from disengaging from said stowage region.

4. The cable organizing device according to claim 1, wherein said intermediate portion of said second component is substantially C-shaped, and is adapted to partly surround the electronic device in a spaced-apart relationship, one of said front and rear end portions extending substantially perpendicularly from one side of said intermediate portion toward the body of the electronic device, and being provided with a limiting notch in one side thereof which is proximate to the body of the electronic device to be adapted to retain the cable extending therethrough.

* * * * *